April 21, 1936.   R. D. BALLMANN   2,038,337
AIRPLANE WING
Filed Oct. 29, 1934   3 Sheets-Sheet 1
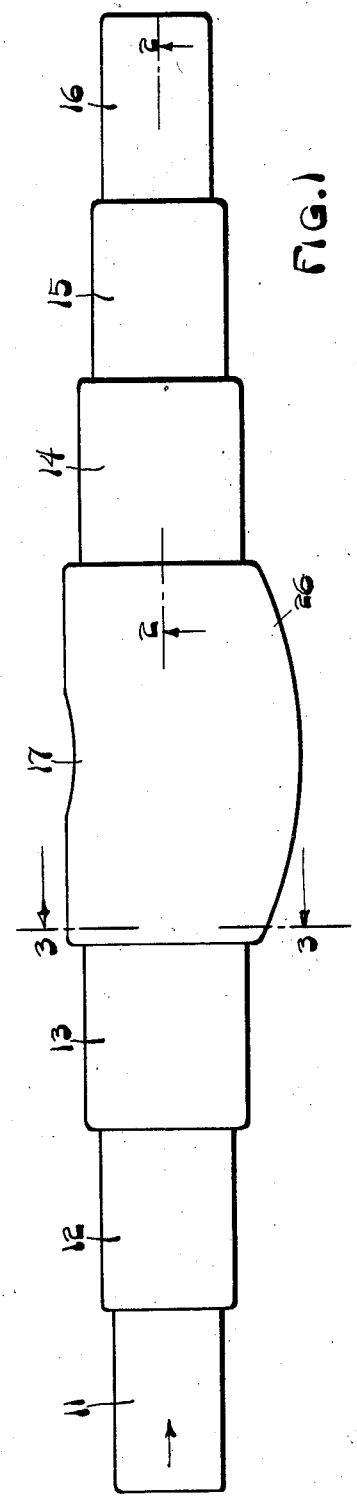
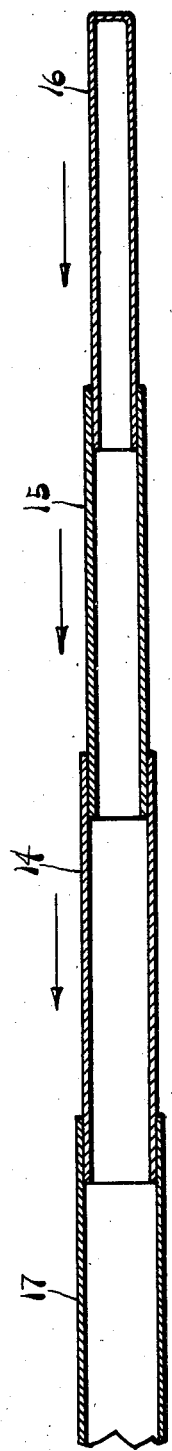
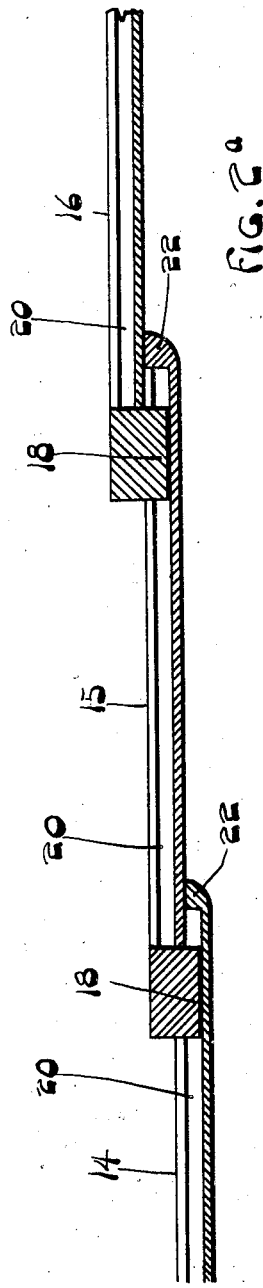
INVENTOR.
Ralph D. Ballmann April 21, 1936.　　R. D. BALLMANN　　2,038,337

AIRPLANE WING

Filed Oct. 29, 1934　　3 Sheets-Sheet 2

INVENTOR.

Ralph D. Ballmann

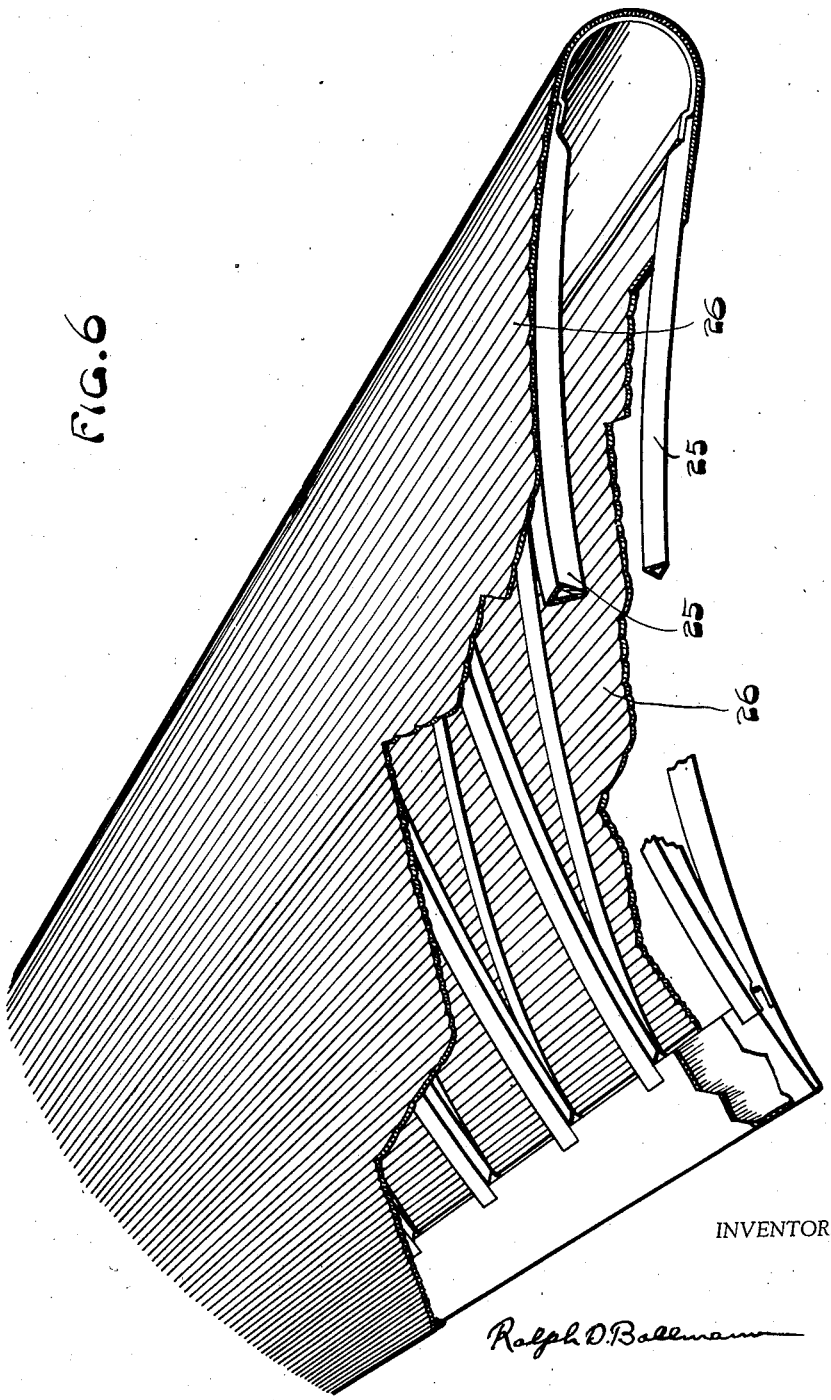

Patented Apr. 21, 1936

2,038,337

UNITED STATES PATENT OFFICE 2,038,337

AIRPLANE WING

Ralph D. Ballmann, Cincinnati, Ohio

Application October 29, 1934, Serial No. 750,470

1 Claim. (Cl. 244—12)

An object of my invention is to produce an airplane wing capable of expansion and contraction lengthwise whereby conservation of storage space in hangars is attained, together with certain attainments in alteration of speed, take-off and landing characteristics.

These and other objects are attained in the airfoil construction described in the following specification and illustrated in the accompanying drawings, in which:

Fig. 1 is a plan view of a characteristic airfoil construction embodying my invention, on a materially reduced scale.

Fig. 2 is a slightly enlarged and somewhat diagrammatic sectional view of one part of the wing shown in Fig. 1, to illustrate the manner of telescopic arrangement of wing sections, not intended to disclose details of structure, and taken on line 2—2 of Fig. 1.

Fig. 2a is a materially enlarged fragmental sectional view of the extended relationship which exists when wing sections are moved to the positions shown in Fig. 1 and somewhat in such a location through the wing keys and keyways as is found on line 2a—2a of Fig. 4.

Fig. 6 is a fragmental perspective sectional view of one of the wing sections, showing parts broken away to disclose interior as well as exterior details of construction.

Figure 3:
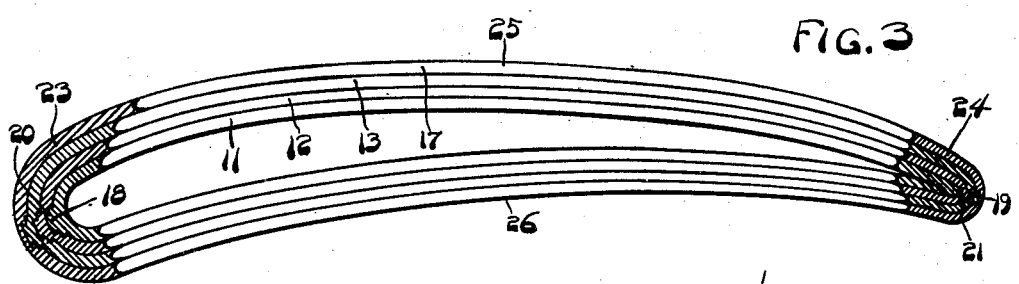
Fig. 3 is a transverse sectional view of the nested wing sections when telescoped to minimum spread positions and taken along a position somewhat as indicated by line 3—3 of Fig. 1.

The airfoil embodying my invention is composed of as many telescoping sections 11, 12, and 13 on one side of a central section 17 and as many sections 14, 15, and 16 on the opposite side of central section 17 as may be desired, in keeping with the size of the plane, the purpose for which it is designed, and the like. While sections 11 and 16 telescope into the respective sections 12 and 15, and sections 12 and 15 telescope into the respective sections 13 and 14, the telescoping of sections 13 and 14 into central section 17 will reduce the wing to the utmost of minimum dimensions approximating no greater size than the spread of the landing gear. In this manner extreme economy of hangar is attained.

So that the airfoil sections may be properly guided and locked in outward and inward movements and limitations thereof, I provide along the nose and trailing edges of the wing sections a series of keys 18 and 19 respectively which extend beyond the surfaces of the sections and are shaped to engage correspondingly shaped keyways 20 and 21 respectively formed in the inside surfaces of the respective nose and trailing edges of the wing sections. These keys, as shown in Fig. 2a, engage abutments 22 at the outer ends of the wing sections, thereby limiting outward movement of the sections to produce the completely expanded airfoil, while inward collapsing movement of the sections is limited by abutment of the keys against each other and by abutment of sections 13 and 14 at their inner ends within central section 17, obviously, central section 17 is the one to which the body, cabin or cockpit elements of the plane are attached.

Figure 4:
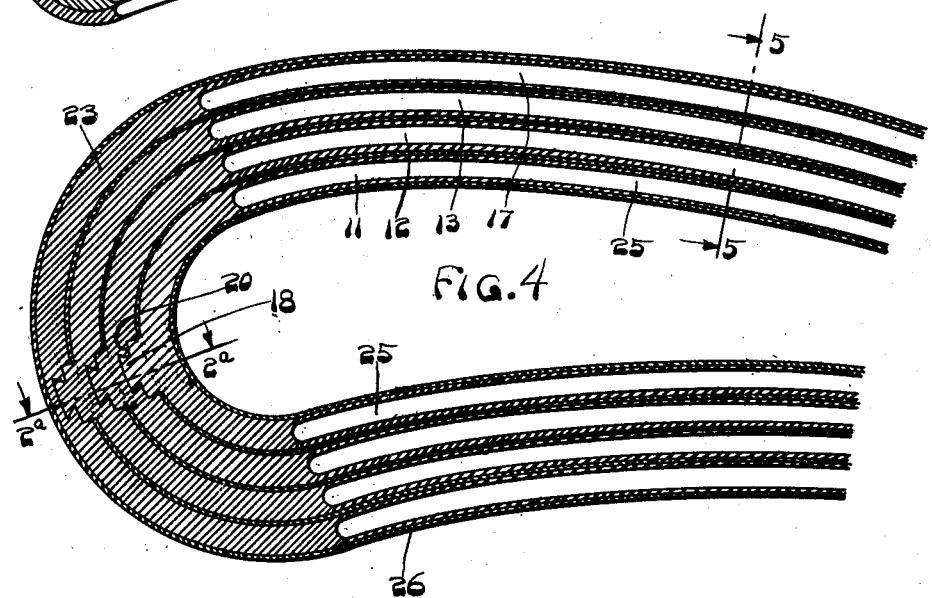
Fig. 4 is a much enlarged sectional view of the nose of the nested wing sections as shown in Fig. 3, greater detail of structural features thereby being possible.
Figure 5:
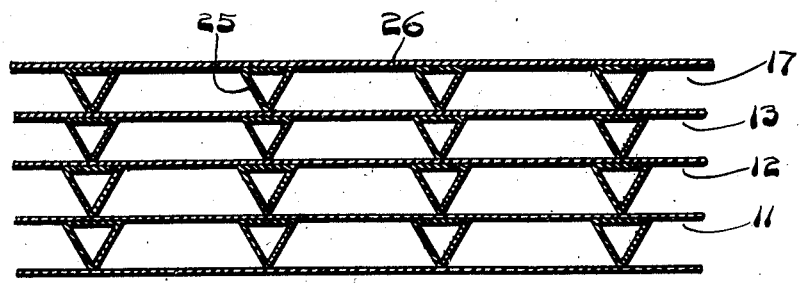
Fig. 5 is an enlarged fragmental sectional view of wing section structure and taken on line 5—5 of Fig. 4.

I shall now describe the wing structure which comprises the spars, and surface material of each section. Preferably, the nose and trailing edge of each section, at the location of the key thereof, is made of skeleton reenforced spars 23 and 24 respectively of solid or suitably light and strong material extending to and terminating the immediate curvature of the nose and trailing edge, as Figs. 3 and 4 disclose. Between these, the under and upper surface parts of the sections are made up of ribs 25 at properly spaced intervals extending transversely from nose to trailing edge and fastened to the spars to form the framework of each section, over the outer surface of which suitable wing covering material 26 is placed and properly secured. I prefer to have this material consist of corrugated metal of suitable alloy, guage, and corrugation, with ribs and spars of the same metal so that unitary welding or other appropriate fastening may be included throughout the fabrication of each section. Also I have found that placement of the corrugated covering is preferable with the corrugations extending longitudinally of the airfoil, as shown in Fig. 6, so as to cross the ribs, thereby aiding in section strengthening effect.

I prefer ribs of triangular cross sectional shape and hollow, so as to create the greatest degree of strength possible, both torsional and bending, with pronounced reduction of mass and consequent weight because of such hollow formation, as well as economy of material needed in such elements.

Fig. 6, which has not included the key and keyway features described, is a modification designed primarily to show that both nose and trailing-edge spars may be of sheet metal, to which the flattened rib ends may be attached, as by welding. Also, this view shows how the covering material may extend completely around the outer surfaces of each wing section, with corrugations extending in a longitudinal direction.

Having thus described my invention what I claim is:

An airplane wing consisting of a series of sections telescopically interrelated, each section consisting of a spar forming the nose edge, a spar forming the trailing edge, a series of spaced upper surface ribs, a series of spaced under surface ribs, said series being spaced apart and spacing the spars apart, whereby a section-receiving space encompassed by the ribs and spars is formed, said sections having relative sizes permitting of telescoping interrelation, keys splined on the spars and uniting the sections, covering material for each section, corrugated and extending transversely of the ribs, and abutments on the sections limiting relative movement of the sections.

RALPH D. BALLMANN.